May 10, 1960     S. H. SMITH     2,936,094
BATTERY BOX
Filed May 7, 1958

INVENTOR.
STANLEY H. SMITH
BY Evans & Pearne
ATTORNEYS

United States Patent Office 2,936,094
Patented May 10, 1960

---

2,936,094

BATTERY BOX

Stanley H. Smith, St. Petersburg, Fla., assignor to Everlast, Inc., Cleveland, Ohio, a corporation of Florida Application May 7, 1958, Serial No. 733,622

1 Claim. (Cl. 220—44)

This invention relates to new and improved battery containers or boxes, and more particularly, it relates to durable, corrosion-resistant boxes which will protect batteries in installations where they are exposed to the weather, such as along a railway track.

To insure continuous, uninterrupted service of primary batteries necessary to operate railroad lights such as marker lights, signal lights, etc., it is necessary to protect the batteries from the weather and other destructive forces by some type of container or box. These containers generally have been made entirely of metal or of combinations of concrete and metal with a hinged cover. Although these containers provided the required protection for the batteries, the containers had a number of serious deficiencies. For example, the metal portion of the containers is subject to corrosion and even if provided with a protective coating, this coating must be renewed periodically.

This corrosion problem led to the use, in some cases, of concrete containers with a metal cover, the concrete providing improved resistance to corrosion as compared with the metal containers. However, in designing concrete containers, it was necessary to provide sufficiently thick walls so that the container could withstand freezing and thawing without cracking. This requirement created an additional problem in that such a design greatly increased the weight of the container which made movement or transfer difficult.

Another problem in the design of a suitable battery container was the fact that generally the batteries employed were of the air-depolarizing type which required a free flow of air around the battery. Thus, provision had to be made for some type of ventilating means. The most simple ventilation was to provide a number of openings in the sides of the container, but this was unsatisfactory since it permitted rain or snow to contact the battery. Various other schemes for ventilating also were suggested but generally these involved complicated and/or expensive modification of the containers.

The hinge cover of the container although simple to open and close was not completely satisfactory because of the increased cost of manufacturing and because it necessitated location of the container so that there was sufficient space to raise the cover without interference.

In view of the above-described deficiencies in the battery containers employed heretofore, it was totally unexpected and surprising to find that these deficiencies could be completely overcome by a new and improved container which is simple in construction and relatively low in manufacturing cost. Moreover, the design of these containers provides improved weather protection for the batteries while permitting proper ventilation for efficient operation of the batteries. Also, the problem of maintenance is reduced to a minimum. Furthermore, the unique construction of the cover permits convenient removal of the cover so that the entire body portion of the box may be opened for inspecting, repairing, or replacing the battery therein.

Accordingly, an object of the present invention is to provide a new battery container which will afford better protection for the battery from the weather.

Another object is to provide a battery box which is non-corrosive and requires substantially no maintenance.

Another object is to provide a battery box which is simple in construction and can be manufactured at a low cost.

Other objects and advantages of the invention will be apparent from the following detailed description and the drawing, in which.

Figure 1:
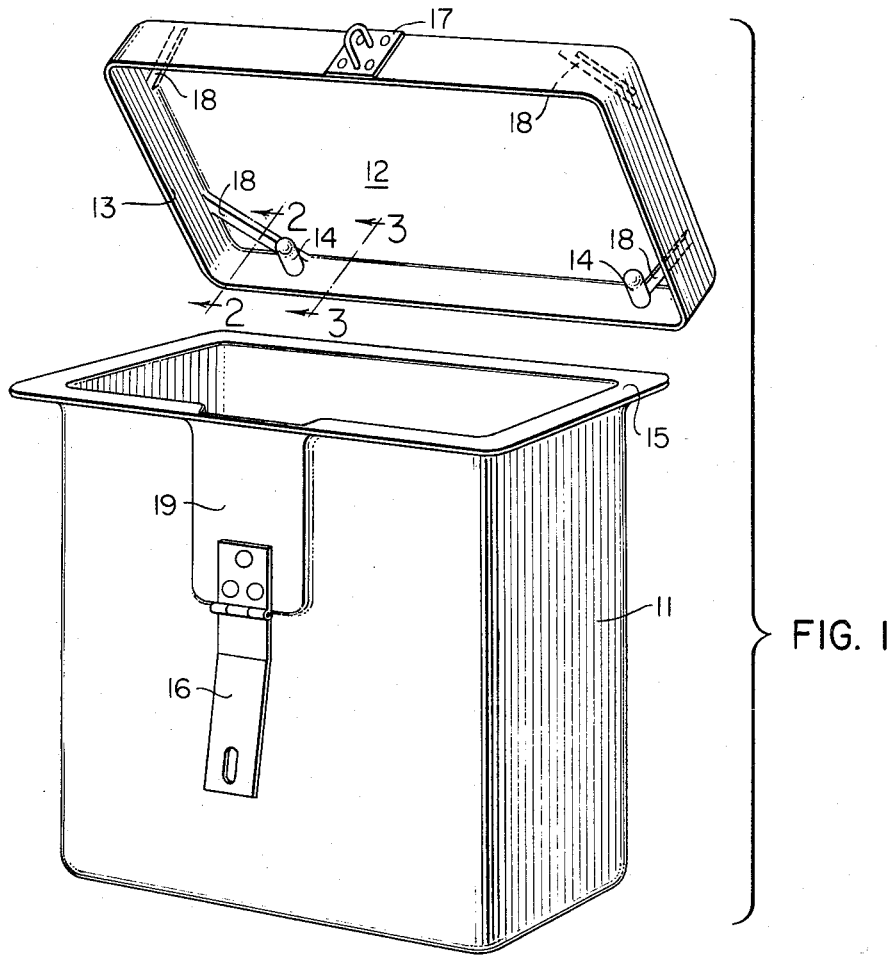
Figure 1 is a schematic drawing of the battery box of the invention.
Figure 3:
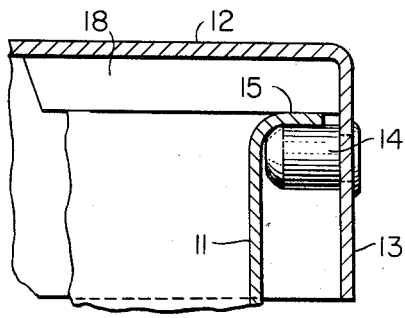
Figure 3 is an enlarged sectional view along line 3—3 of Figure 1, showing the position of a securing stud on the cover with respect to the flange.
Figure 2:
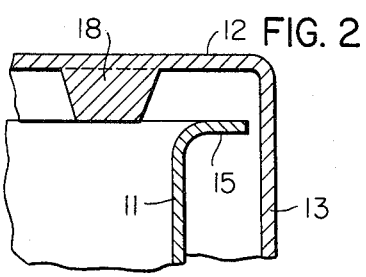
Figure 2 is an enlaged sectional view along line 2—2 of Figure 1, showing the position of the cover with respect to the flange of the lower container.

The battery container of the present invention comprises a bottom body portion 11 and a cover 12 therefor. The body portion 11, preferably, is rectangular and consists of a bottom and four sidewalls, the upper portions of which terminate in out-turned flanges 15. Advantageously, the out-turned flanges form a continuous peripheral flange.

The cover 12 is constructed so that it can be completely removed from the body portion 11 to afford convenient inspection of the battery therein. The cover has a depending rim section 13 on one side of which is located a pair of studs 14 extending inwardly toward the center of the cover. The cover 12 is secured to the bottom body portion 11 by moving the rear portion of the cover into position with respect to the outwardly extending flange 15 located around the opening of the body portion 11 so that the studs 14 will slide beneath flange 15, and then allowing the cover to swing down into place over the opening.

The body portion 11 has a suitable fastening means positioned on its front side so that the cover 12 can be securely fastened thereto. The fastening means shown in Figure 1 is a hasp 16 which may be placed over a ring 17 to secure the cover to the body portion, and a suitable lock (not shown) may be employed to prevent unauthorized opening of the box.

The cover can be easily and conveniently removed with one hand by simply removing the lock, dropping the hasp 16, raising the front part of the cover, and sliding the cover back so that studs 14 will be disengaged from flange 15.

One of the principal uses of the battery boxes of the present invention is by the railroads where batteries are employed to operate signals, switches, and other devices. Frequently, these batteries are air-depolarized batteries in which the electrical current is created by the oxidation of zinc with air. To provide the necessary air circulation for this type of battery, a number of ribs 18 are located in the cover portion of the container preferably in the region of the corners. When the cover is positioned on the body portion 11, the ribs act to prevent the cover from closely fitting down on flange 15 of the body portion and keep the cover spaced a short distance above the flange. This spacing permits air to circulate freely through the box without allowing snow or rain to come in contact with the battery. The ribs 18 being positioned in the corner regions of the cover, as shown in Figure 1, provide additional bracing and reinforcement of the cover.

Preferably, the cover 12 and the depending rim section 13 are of a size so that the rim extends below and is slightly spaced from the out-turned flange or flanges 15 of the body portion. This construction provides complete weather protection for the battery without impairing the free circulation of air through the battery box. The rim section also acts as a drip shield to drain off any moisture collected on the cover without allowing the moisture to seep into the container.

The battery boxes of the present invention may be constructed of any suitable corrosion-resistant material. Advantageously, the box is constructed of a plastic or resin-reinforced material which not only is corrosion-resistant but also is a dielectric material. Preferably, the battery boxes are constructed of a polyester resin reinforced with glass fibers.

As stated above, the flange 15 around the opening of the bottom body portion 11 may extend either completely or only partially around the opening. However, when only a partial flange is employed, the flange portion should be positioned to provide engagement with studs 14 and the cover 12. The position and number of studs is not critical but rather depends upon the particular shape and size of the box and the particular installation in which the box is employed. The studs may be molded as an integral part of the cover or, preferably, may be metal studs of a corrosion-resistant metal or alloy, such as nickel, copper, brass, etc.

The fastening means may be any of a wide variety of conventional locks or catches such as the hasp discussed above. If desired, as shown in Figure 1, the hasp may be positioned on a portion 19 of box 11, which extends outwardly from the wall thereof. The employment of an outwardly extending portion provides a substantially vertical plane for the positioning of the fastening means.

As shown in the above description, the present invention provides a new and unique construction for a battery enclosure which is simple in construction and can be manufactured at low cost. In addition, these battery boxes are corrosion-resistant and provided improved weather protection without impairing the free circulation of air through the box.

It will be apparent to one skilled in the art that various modifications can be made in the battery boxes described without departing from the scope of the invention. Therefore, the invention will be restricted only by the following claim.

What is claimed is:

A battery container for railroad signals and the like providing a weatherproof housing for a battery which comprises a rectangular, bottom body portion having an outwardly extending flange around the upper opening of said body portion, a rectangular cover having a top and a depending rim section around said top, ribs depending from the top and extending across the corners thereof to connect and reinforce the sides of the depending rim section and to maintain said cover in spaced relation to said bottom body portion, a plurality of studs extending inwardly along a portion of said depending section, and fastening means arranged in opposing relation to said studs so that said cover may be secured to said body portion by engagement of said studs beneath said outwardly extending flange and by said fastening means, whereby said cover can be quickly removed from said body portion to give full access to said battery, said depending rim section being spaced outwardly from and extending substantially below said outwardly extending flange when the cover is placed on the body portion, to prevent entrance of extraneous materials into said container while permitting movement of air between said cover and said body portion of the battery container.

References Cited in the file of this patent
UNITED STATES PATENTS

| | | |
|---|---|---|
| 1,843,918 | Cornell | Feb. 9, 1932 |
| 2,442,705 | Meyer | June 1, 1948 |